(12) United States Patent
Seo et al.

(10) Patent No.: US 7,369,781 B2
(45) Date of Patent: May 6, 2008

(54) BURST MODE OPTICAL RECEIVER CONSIDERING CHARACTERISTIC OF EXTINCTION RATIO OF RECEIVED OPTICAL SIGNAL

(75) Inventors: Ja Won Seo, Goyang (KR); Ho Yong Kang, Daejeon (KR); Hyun Kyun Choi, Daejeon (KR); Tae Whan Yoo, Daejeon (KR); Hyeong Ho Lee, Daejeon (KR); Sang Gug Lee, Daejeon (KR); Man Seop Lee, Daejeon (KR)

(73) Assignee: Electronics and Telecommunications Research Institute, Dajeon (KR)

( * ) Notice: Subject to any disclaimer, the term of this patent is extended or adjusted under 35 U.S.C. 154(b) by 669 days.

(21) Appl. No.: 10/705,100

(22) Filed: Nov. 10, 2003

(65) Prior Publication Data

US 2004/0190913 A1    Sep. 30, 2004

(30) Foreign Application Priority Data

Mar. 29, 2003 (KR) .................. 10-2003-0019821

(51) Int. Cl.
*H04B 10/06* (2006.01)
*H03G 3/30* (2006.01)

(52) U.S. Cl. .............. 398/202; 398/208; 398/209; 398/210; 330/250; 330/254; 330/278; 330/296; 330/136; 375/316; 375/317; 375/318

(58) Field of Classification Search ........ 398/202–209; 330/59, 279–308
See application file for complete search history.

(56) References Cited

U.S. PATENT DOCUMENTS

| | | | | |
|---|---|---|---|---|
| 4,317,083 A | * | 2/1982 | Boyd .................... | 330/296 |
| 4,592,073 A | * | 5/1986 | Watanabe ............... | 375/297 |
| 5,475,342 A | | 12/1995 | Nakamura et al. | |
| 5,955,921 A | | 9/1999 | Ide et al. | |
| 6,292,058 B1 | * | 9/2001 | Ide et al. ............... | 330/279 |
| 6,907,202 B1 | * | 6/2005 | Ide et al. ............... | 398/208 |
| 6,911,644 B2 | * | 6/2005 | Doh et al. ......... | 250/214 AG |
| 2002/0153958 A1 | * | 10/2002 | Ide ....................... | 330/308 |
| 2003/0194244 A1 | * | 10/2003 | Doh et al. ............. | 398/202 |
| 2003/0202802 A1 | * | 10/2003 | Doh et al. ............. | 398/202 |
| 2003/0206744 A1 | * | 11/2003 | Doh et al. ............. | 398/209 |

OTHER PUBLICATIONS

Ide et al, "3.5 V PON Receiver IC with a High-Speed ATC Circuit", EDMO, Nov. 24-25, 1997, pp. 141-146.*

* cited by examiner

*Primary Examiner*—Kenneth Vanderpuye
*Assistant Examiner*—Li Lui
(74) *Attorney, Agent, or Firm*—Blakely, Sokoloff, Taylor & Zafman LLP

(57) ABSTRACT

Provided is a burst mode optical receiver considering a characteristic of an extinction ratio of a received optical signal is provided. By using a peak detector considering a characteristic of an extinction ratio, top and bottom peak voltages of actual burst packets can be precisely detected while not being affected by a DC offset corresponding to an extinction ratio even though burst packets having a DC offset corresponding to the extinction ratio are received. Accordingly, waveform distortion of a signal output from the burst mode optical receiver can be minimized.

18 Claims, 11 Drawing Sheets

BURST MODE OPTICAL RECEIVER CONSIDERING CHARACTERISTIC OF EXTINCTION RATIO OF RECEIVED OPTICAL SIGNAL

BACKGROUND OF THE INVENTION

This application claims the priority of Korean Patent Application No. 2003-19821, filed on Mar. 29, 2003, in the Korean Intellectual Property Office, the closure of which is incorporated herein in its entirety by reference.

FIELD OF THE INVENTION

The present invention relates to a burst mode receiver, and more particularly, to a burst mode optical receiver considering a characteristic of an extinction ratio of a received optical signal.

DESCRIPTION OF THE RELATED ART

FIG. 1 illustrates a structure of a passive optical network (PON) using a burst mode receiver. In the PON, an optical line termination (OLT) 30 receives an optical packet signal from a plurality of optical network units (ONUs) 10a-10d through a passive optical splitter 20. In this case, an optical receiver of the OLT 30 receives optical packets having different signal sizes, i.e., having a characteristic of burst due to dispersion of optical signals caused by a difference in distance between each of the ONUs 10a-10d. Digital signals in the optical packets have a consecutive value "1" or "0". Likewise, the burst mode receiver is used in an OLT for receiving optical packet signals having a characteristic of burst.

Meanwhile, a laser diode (LD) used for a light source in a transmitter has a characteristic shown in FIG. 2, among a driving current, temperature, and optical power. In this case, an extinction ratio of the LD is represented as $P_1/P_0$. In this case, $P_0$ represents light intensity when data is "0", and $P_1$ represents light intensity when data is "1". Ideally, the extinction ratio should be an infinite quantity $\infty$. That is, when data is "0", an optical signal should be not detected. However, in actuality, a weak signal is detected, as shown in FIG. 2. Due to the characteristic of the extinction ratio of the LD, there is a good possibility of pulse width distortion (PWD) in a receiver.

Thus, data can be precisely detected in the receiver only when the characteristics of both burst and extinction ratio of the received optical signal are considered.

FIG. 3 illustrates a structure of a peak detector (see U.S. Pat. No. 5,475,342) used in a conventional feed forward-type burst mode optical receiver. Referring to FIG. 3, the peak detector includes a top-hold circuit 100 for detecting a top peak voltage and a bottom-hold circuit 110 for detecting a bottom peak voltage. The peak detector having the above shape is suitable for an ideal optical signal, i.e., in a case where an extinction ratio is an infinite quantity $\infty$. However, the peak detector having the above shape is not suitable in a case where the extinction ratio is not an infinite quantity $\infty$, i.e., for an optical signal generated by a principle shown in FIG. 2. This is because when a peak detection capacitor 101 of the top-hold circuit 100 is discharged by a reset signal after a received signal passes preamplifier, the peak detection capacitor 101 is discharged as a circuit DC voltage higher than a top peak voltage of an optical packet signal to be later input. Thus, even though a next optical packet signal is input after the reset signal is terminated, the capacitor 101 is not charged and is maintained at the circuit DC voltage. Finally, a wrong top peak voltage is detected to an output terminal OUT of the top-hold circuit 100. Here, the reset signal is used to discharge top and bottom hold circuits in a section where an optical packet signal does not exist.

FIG. 4 illustrates a structure of a feed back-type burst mode optical receiver. The feed back-type burst mode optical receiver is used to remove dark level signals that exist in a received optical signal (see U.S. Pat. No. 5,430,766). The receiver shown in FIG. 4 removes dark level signals using a DC compensator placed on the front end of a preamplifier. However, it is difficult to precisely remove the dark level signals by combination of peak detectors 206 and 208, an amplifier 204, and a low pass filter 202, as shown in FIG. 4, and the structure of the receiver is complicated.

Accordingly, a burst mode optical receiver which minimizes distortion by precisely detecting a peak voltage while having a simpler circuit structure and not being affected by a characteristic of an extinction ratio of a received optical signal, is required.

SUMMARY OF THE INVENTION

The present invention provides a burst mode optical receiver considering a characteristic of an extinction ratio of a received optical signal.

According to an aspect of the present invention, a burst mode optical receiver includes a photo diode, which receives an optical signal having characteristics of a predetermined extinction ratio and burst from outside and converts the received optical signal into a current signal, a preamplifier, which converts the signal converted by the photo diode into a voltage signal, amplifies the voltage-converted signal, and outputs the amplified signal, a first peak detector, which detects top and bottom peak voltages of the signal amplified by the preamplifier on the basis of a predetermined DC voltage controlled by a control signal and outputs a middle value between the detected top peak voltage and bottom peak voltage as a first reference voltage, a first limiting amplifier, which inputs the signal amplified by the preamplifier and the first reference voltage and amplifies a difference therebetween, a buffer, which buffers the signal limitedly amplified by the first limiting amplifier, and a first bottom peak detector, which detects a bottom peak voltage of the signal output from the buffer and outputs the bottom peak voltage as the control signal.

According to another aspect of the present invention, a burst mode optical receiver includes a photo diode, which receives an optical signal having characteristics of a predetermined extinction ratio and burst from outside and converts the received optical signal into a current signal, a preamplifier, which converts the signal converted by the photo diode into a voltage signal, amplifies the voltage-converted signal, and outputs the amplified signal, a first peak detector, which detects top and bottom peak voltages of the signal amplified by the preamplifier on the basis of a predetermined DC voltage controlled by a control signal and outputs a middle value between the detected top peak voltage and bottom peak voltage as a first reference voltage, a first limiting amplifier, which inputs the signal amplified by the preamplifier and the first reference voltage and amplifies a difference therebetween, a buffer, which buffers the signal limitedly amplified by the first limiting amplifier, and a second limiting amplifier, which inputs a predetermined comparison voltage and the bottom peak voltage detected by the first peak detector, amplifies a difference therebetween, and outputs an amplification result as the control signal.

According to another aspect of the present invention, a burst mode optical receiver includes a photo diode, which receives an optical signal having characteristics of a predetermined extinction ratio and burst from outside and converts the received optical signal into a current signal, a preamplifier, which converts the signal converted by the photo diode into a voltage signal, amplifies the voltage-converted signal, and outputs the amplified signal, a first peak detector, which detects top and bottom peak voltages of the signal amplified by the preamplifier on the basis of a predetermined DC voltage controlled by a control signal and outputs a middle value between the detected top peak voltage and bottom peak voltage as a first reference voltage, a first limiting amplifier, which inputs the signal amplified by the preamplifier and the first reference voltage and amplifies a difference therebetween, a buffer, which buffers the signal limitedly amplified by the first limiting amplifier, and an envelope detector, which detects an envelope of the optical signal and outputs the detected envelope signal as the control signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the accompanying drawings.

Figure 1:
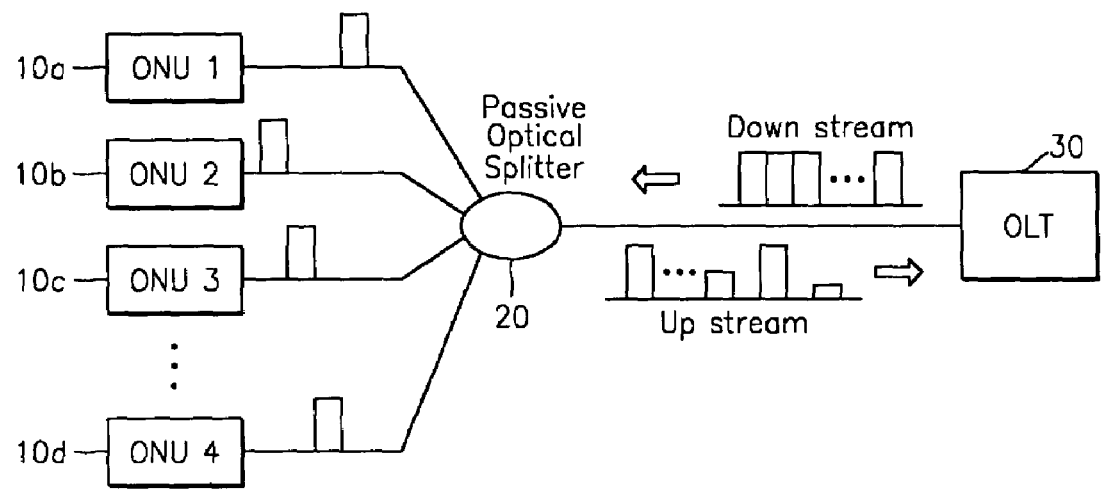
FIG. 1 illustrates a structure of a passive optical network (PON) using a burst mode receiver.
Figure 2:
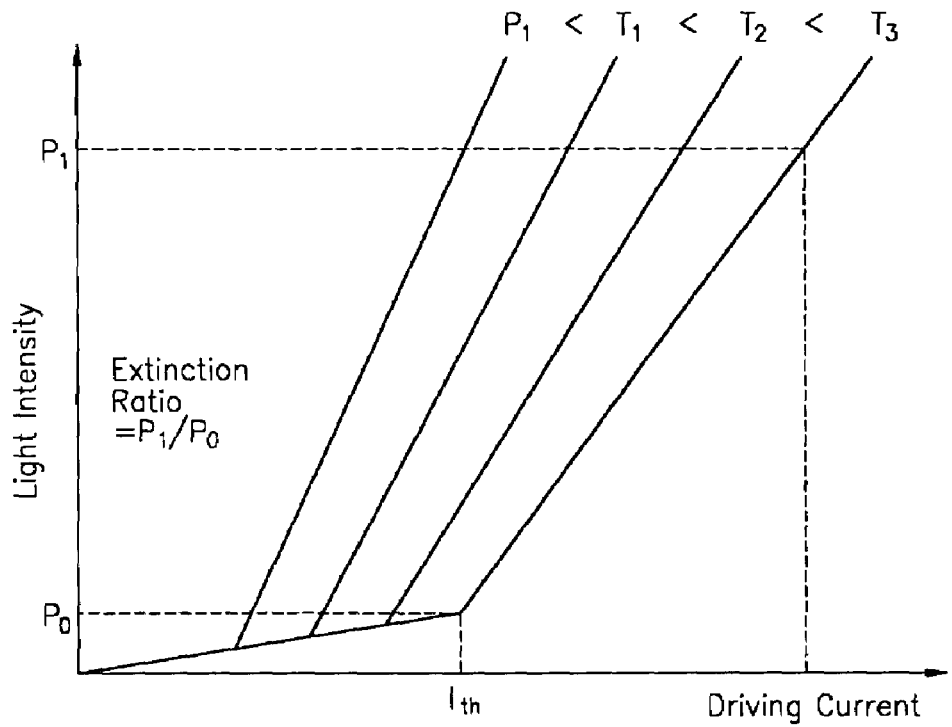
FIG. 2 is a graph illustrating a characteristic among a driving current, temperature, and optical power of a laser diode (LD) used for a light source in a transmitter.
Figure 3:
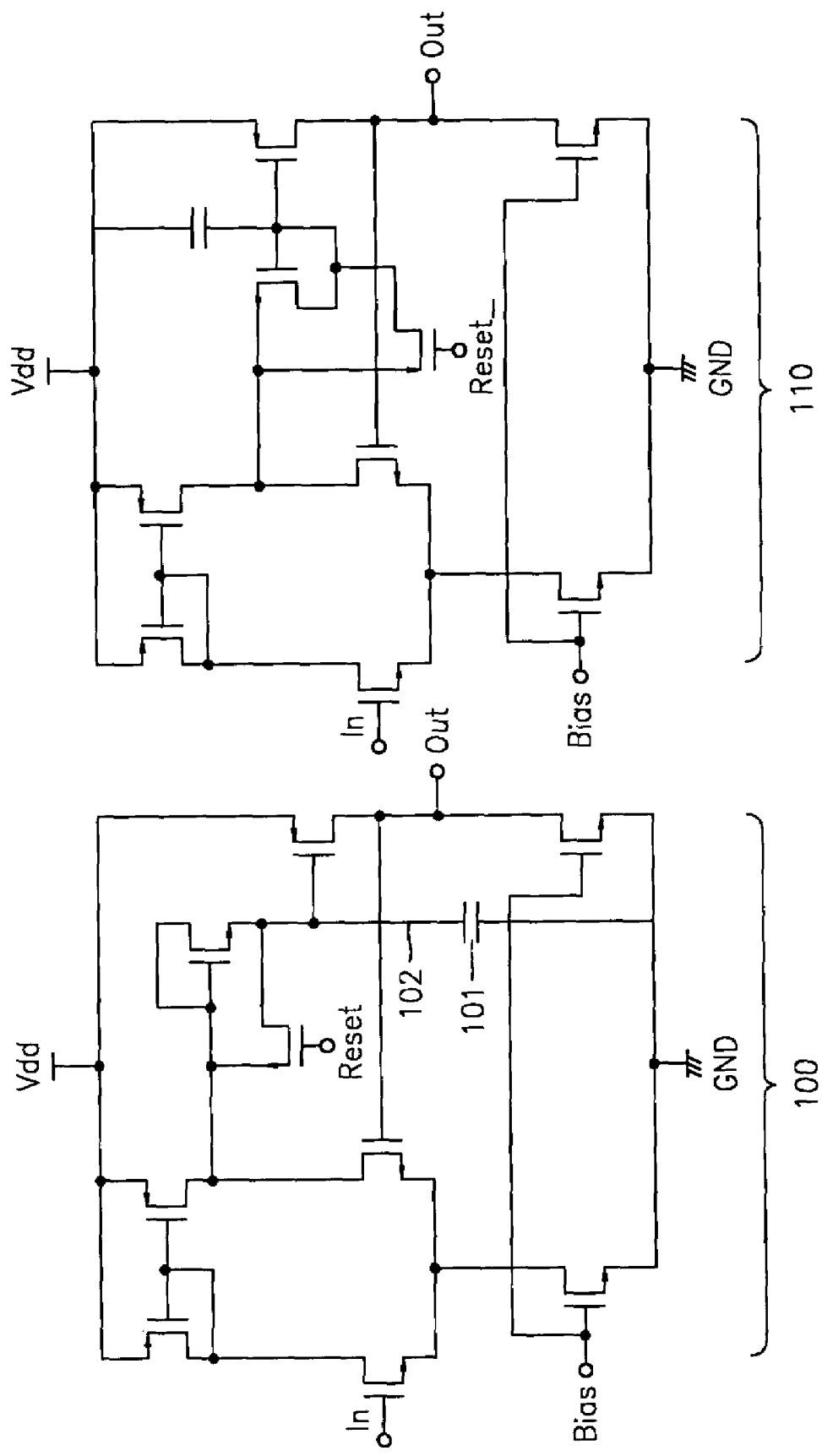
FIG. 3 illustrates a structure of a peak detector used in a conventional feed forward-type burst mode optical receiver.
Figure 4:
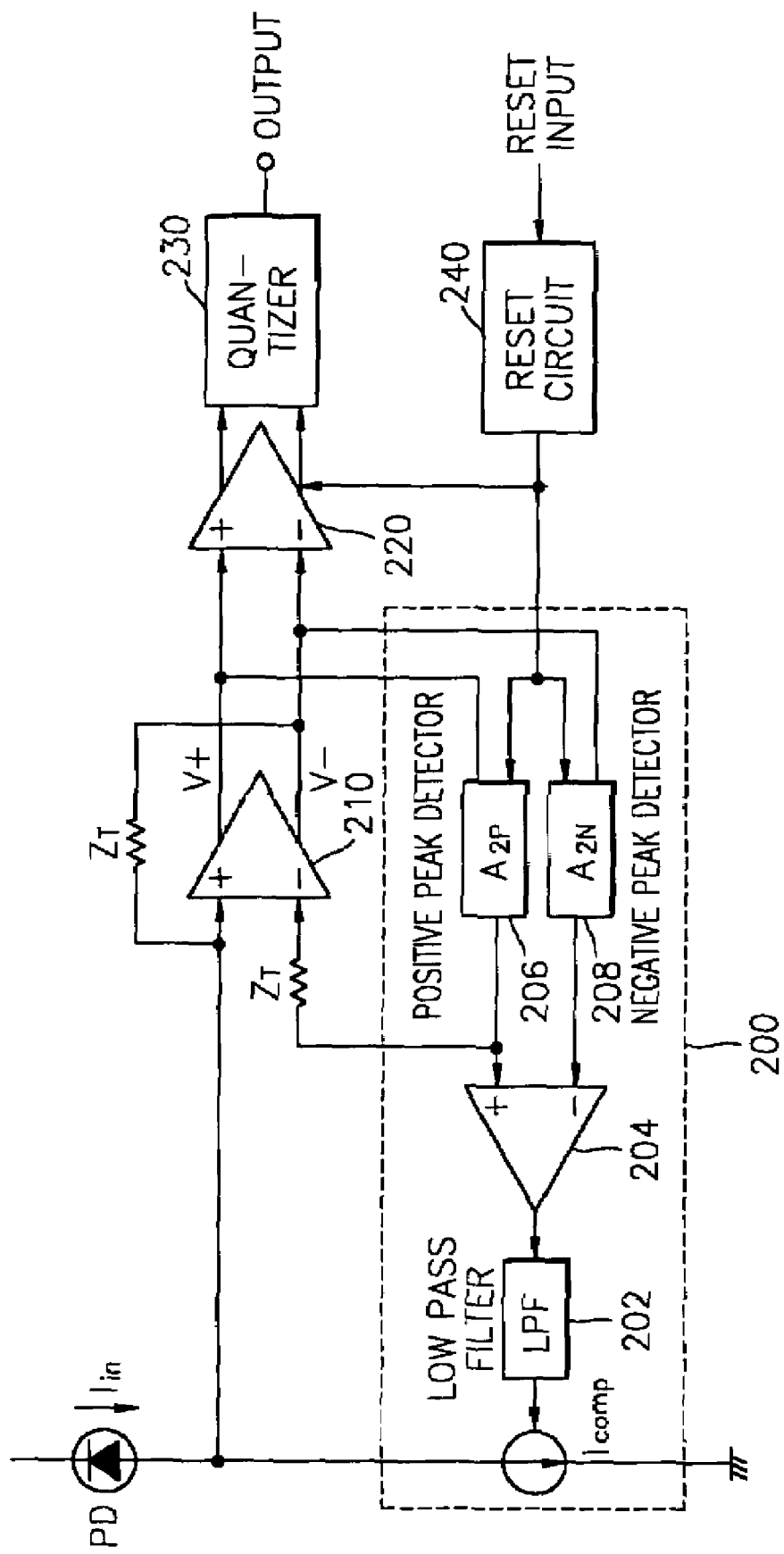
FIG. 4 illustrates a structure of a feed back-type burst mode optical receiver.
Figure 5:
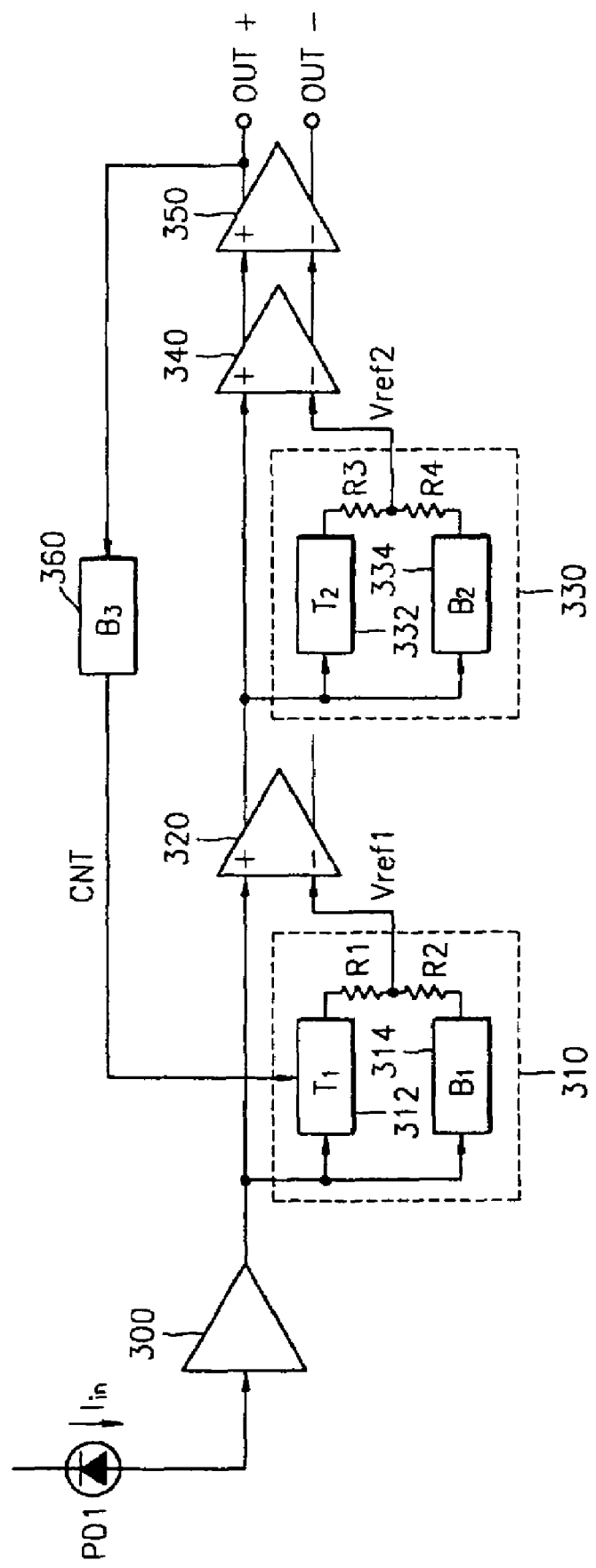
FIG. 5 schematically illustrates a structure of a burst mode optical receiver according to an embodiment of the present invention.

FIG. 5 schematically illustrates a structure of a burst mode optical receiver according to an embodiment of the present invention. Referring to FIG. 5, the burst mode optical receiver includes a photo diode PD1, a preamplifier 300, first and second peak detectors 310 and 330, first and second limiting amplifiers 320 and 340, a buffer 350, and a bottom peak detector 360.

The photo diode PD1 receives an optical signal having a predetermined extinction ratio from outside and converts the received optical signal into a current signal.

The preamplifier 300 converts the current signal converted by the photo diode PD1 into a voltage signal and amplifies the voltage-converted signal.

The first peak detector 310 detects a top peak voltage and a bottom peak voltage of a signal amplified by the preamplifier 300 on the basis of a DC voltage controlled by controlling a control signal CNT and outputs a middle value between the detected top peak voltage and detected bottom peak voltage as a first reference voltage $V_{ref1}$. As shown in FIG. 5, the first peak detector 310 includes a top peak detector 312 which detects a top peak voltage of an amplified signal on the basis of a DC voltage by controlling the control signal CNT, a bottom peak detector 314 which detects a bottom peak voltage of the amplified signal, and a middle value generator comprising resistors R1 and R2 which generate a middle value between the top peak voltage and the bottom peak voltage. The top peak detector 312 and the bottom peak detector 314 are charged so as to detect a peak voltage in a section where a burst packet exists and are discharged so as to detect a peak voltage of a next burst packet in a section where the burst packet does not exist. During a discharging operation, the top and bottom peak detectors 312 and 314 are discharged at their circuit DC levels. A circuit DC level of the top peak detector 312 is higher than a top peak level of a burst packet to be later input. Accordingly, the top peak detector 312 does not detect a top peak voltage of the input burst packet and detects the circuit DC level as the top peak voltage wrongly. The control signal CNT is used to control a discharging level of the top peak detector 312 so that the top peak detector 312 is discharged as an electrical potential lower than the circuit DC level, e.g., as 0V, in a section where the burst packet does not exist, so as to prevent wrong detection of the top peak voltage.

The first limiting amplifier 320 inputs the signal amplified by the preamplifier 300 and the first reference voltage $V_{ref1}$, and amplifies a difference therebetween.

The second peak detector 330 detects a top peak voltage and a bottom peak voltage of a signal amplified by the first limiting amplifier 320 and outputs a middle voltage between the detected top peak voltage and the detected bottom peak voltage as a second reference voltage $V_{ref2}$. As shown in FIG. 5, the second peak detector 330 includes a top peak detector 332 which detects a top peak voltage of a signal amplified by the first limiting amplifier 320, a bottom peak detector 334 which detects a bottom peak voltage of the amplified signal, and resistors R3 and R4 which generate a middle value between the top peak voltage and the bottom peak voltage.

The second limiting amplifier 340 inputs a signal output from the first limiting amplifier 320 and the second reference voltage $V_{ref2}$ and amplifies a difference therebetween. A signal amplified by the second limiting amplifier 340 is buffered by a buffer 350 and output. A signal output from the buffer 350 is a signal limitedly amplified at a predetermined level (e.g., LVPECL level) by the first and second limiting amplifiers 320 and 340 regardless of sizes of input optical signals.

The bottom peak detector 360 detects a bottom peak voltage of the signal output from the buffer 350 and outputs a detection result as the control signal CNT. Here, the control signal CNT is used to control a discharging level of the first peak detector 310 in a section where a burst packet does not exist so that the first peak detector 310 detects right top and bottom peak voltages.

Figure 6:
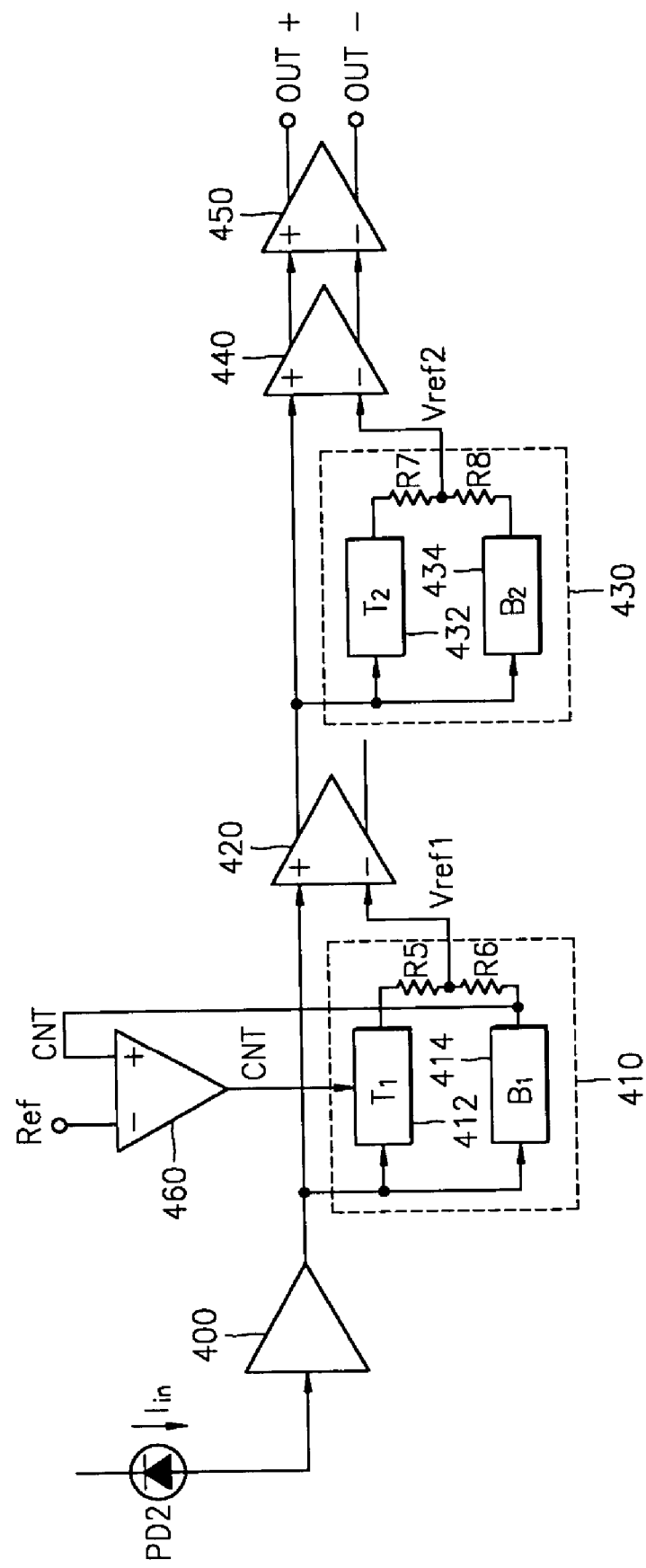
FIG. 6 is a block diagram schematically illustrating a burst mode optical receiver according to another embodiment of the present invention.

FIG. 6 is a block diagram schematically illustrating a burst mode optical receiver according to another embodiment of the present invention. Referring to FIG. 6, the burst mode optical receiver includes a photo diode PD2, a preamplifier 400, first and second peak detectors 410 and 430, first through third limiting amplifiers 420, 440, and 460, and a buffer 450. In FIG. 6, the photo diode PD2, the preamplifier 400, the first and second peak detectors 410 and 430, the first and through third limiting amplifiers 420, 440, and 460, and the buffer 450 perform the same structure and operation as those of the burst mode optical receiver shown in FIG. 5, and thus, detailed descriptions thereof will be omitted.

Referring to FIG. 6, the third limiting amplifier 460 inputs a bottom peak voltage detected by the first peak detector 410 and a predetermined comparison voltage Ref, amplifies a difference therebetween, and outputs an amplified signal as a control signal CNT.

Figure 7:
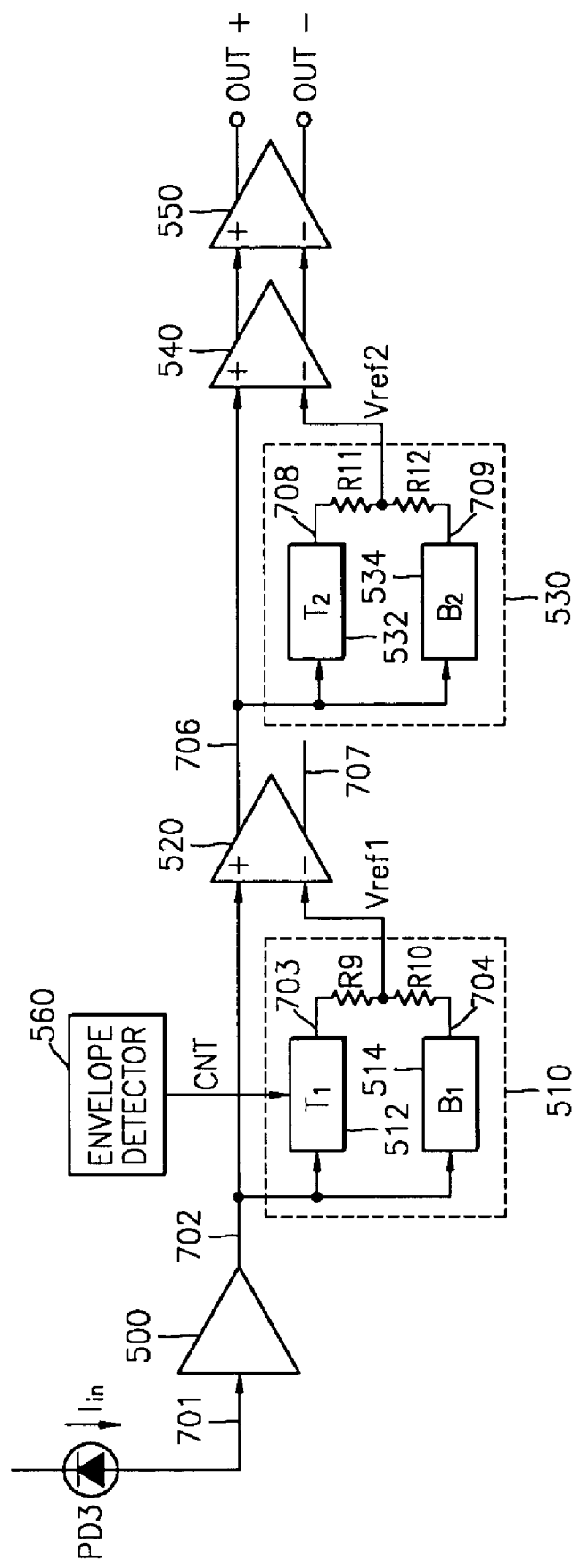
FIG. 7 is a block diagram schematically illustrating a burst mode optical receiver according to another embodiment of the present invention.

FIG. 7 is a block diagram schematically illustrating a burst mode optical receiver according to another embodiment of the present invention. Referring to FIG. 7, the burst mode optical receiver includes a photo diode PD3, a preamplifier 500, first and second peak detectors 510 and 530, first and second limiting amplifiers 520 and 540, a buffer 550, and an envelope detector 560. In FIG. 7, the photo diode PD3, the preamplifier 500, the first and second peak detectors 510 and 530, the first and second limiting amplifiers 520 and 540, and the buffer 550 perform the same structure and operation as those of the burst mode optical receiver shown in FIG. 5, and thus, detailed descriptions thereof will be omitted.

Referring to FIG. 7, the envelope detector 560 detects an envelope of a received optical packet signal and outputs the detected envelope signal as a control signal CNT.

As above, if gains of the first limiting amplifiers 320, 420, and 520 are sufficiently large and outputs therefrom are limitedly amplified at a required level (e.g., LVPECL level), the second limiting amplifiers 340, 440, and 540 and the second peak detectors 330, 430, and 530 may not be used.

FIGS. 8A through 8C illustrate a characteristic of a control signal CNT used to control first peak detectors 310, 410, and 510 shown in FIGS. 5 through 7. FIG. 8A illustrates burst packet signals output from the preamplifiers 300, 400, and 500, and FIG. 8B illustrates reset signals Reset for discharging the first and second peak detectors in a section where the burst packet signals do not exist, and inverted reset signals Reset_, and FIG. 8C illustrates control signals CNT generated in each of the first bottom peak detector 360, the third limiting amplifier 460, and the envelope detector 560. As shown in FIG. 8C, the control signals CNT are enabled in a section where optical signals do not exist and control a discharging level of the top peak detector 312 so that a right top peak voltage is detected.

Figure 9:
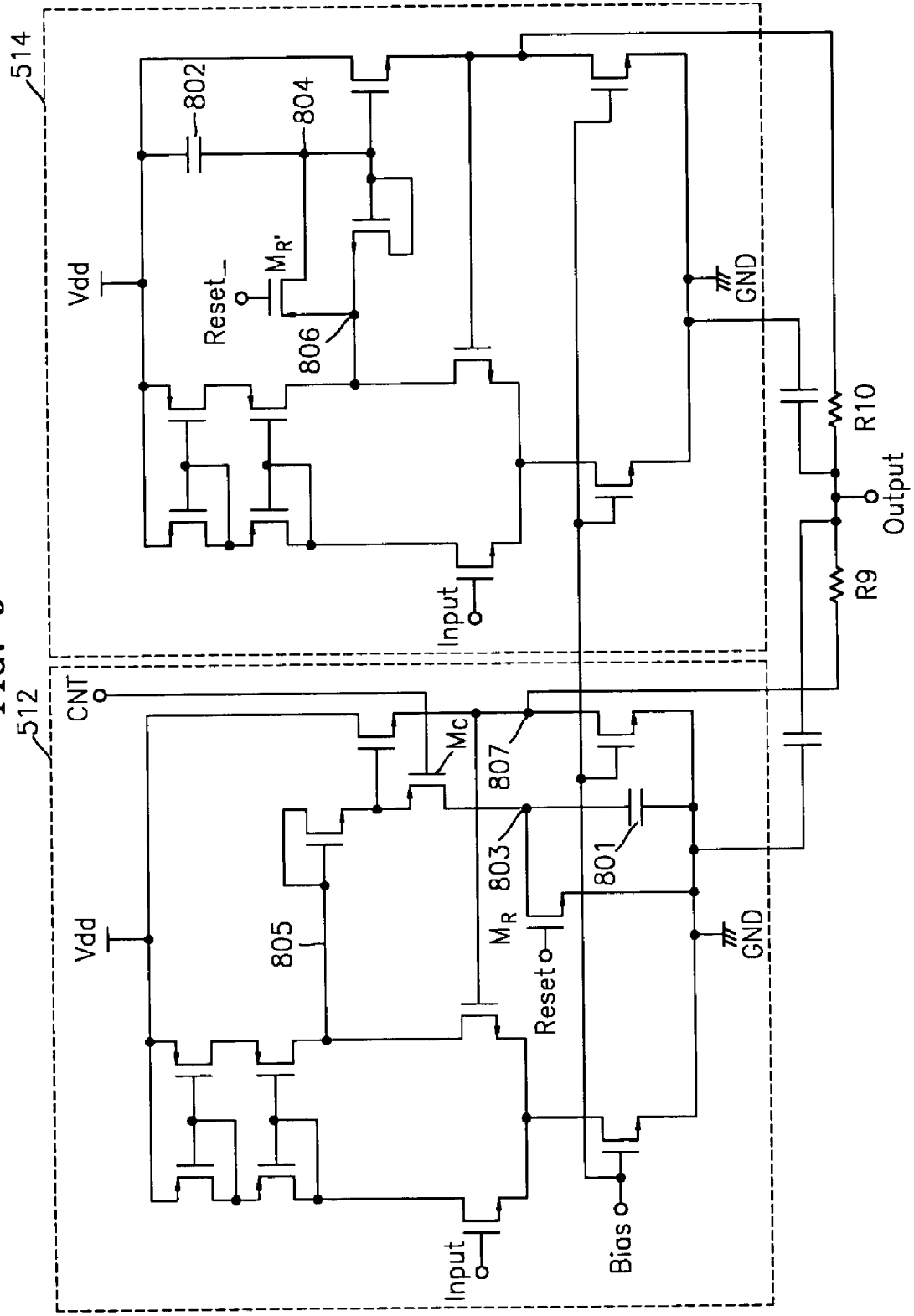
FIG. 9 is a circuit diagram illustrating first peak detectors 312, 412, and 512 shown in FIGS. 5 through 7, according to an embodiment of the present invention.
Figure 10:
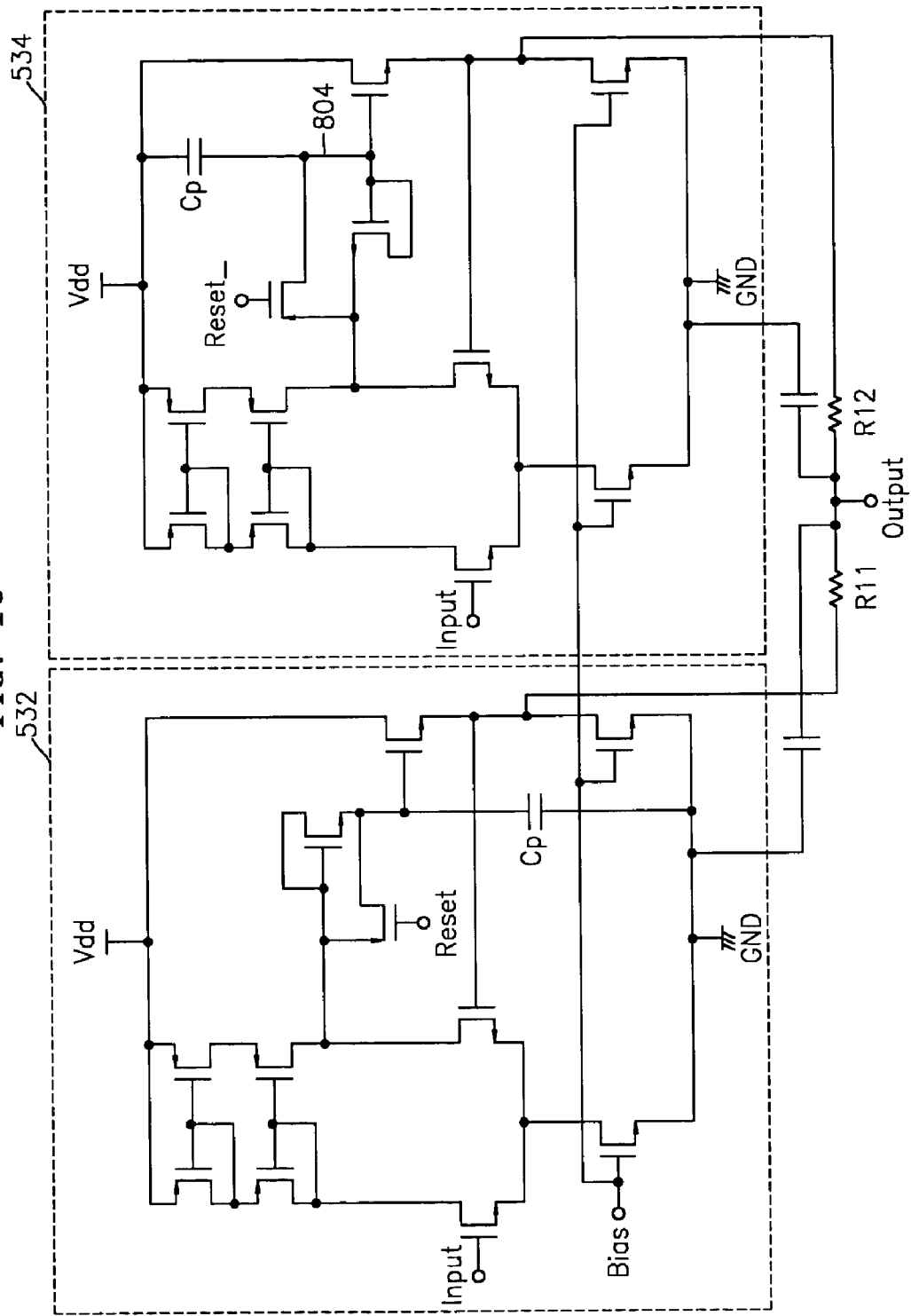
FIG. 10 is a circuit diagram illustrating second peak detectors 332, 432, and 532 shown in FIGS. 5 through 7, according to an embodiment of the present invention.

FIG. 9 is a circuit diagram illustrating first peak detectors 312, 412, and 512 shown in FIGS. 5 through 7, according to an embodiment of the present invention, and FIG. 10 is a circuit diagram illustrating second peak detectors 332, 432, and 532 shown in FIGS. 5 through 7, according to an embodiment of the present invention.

Figure 8:
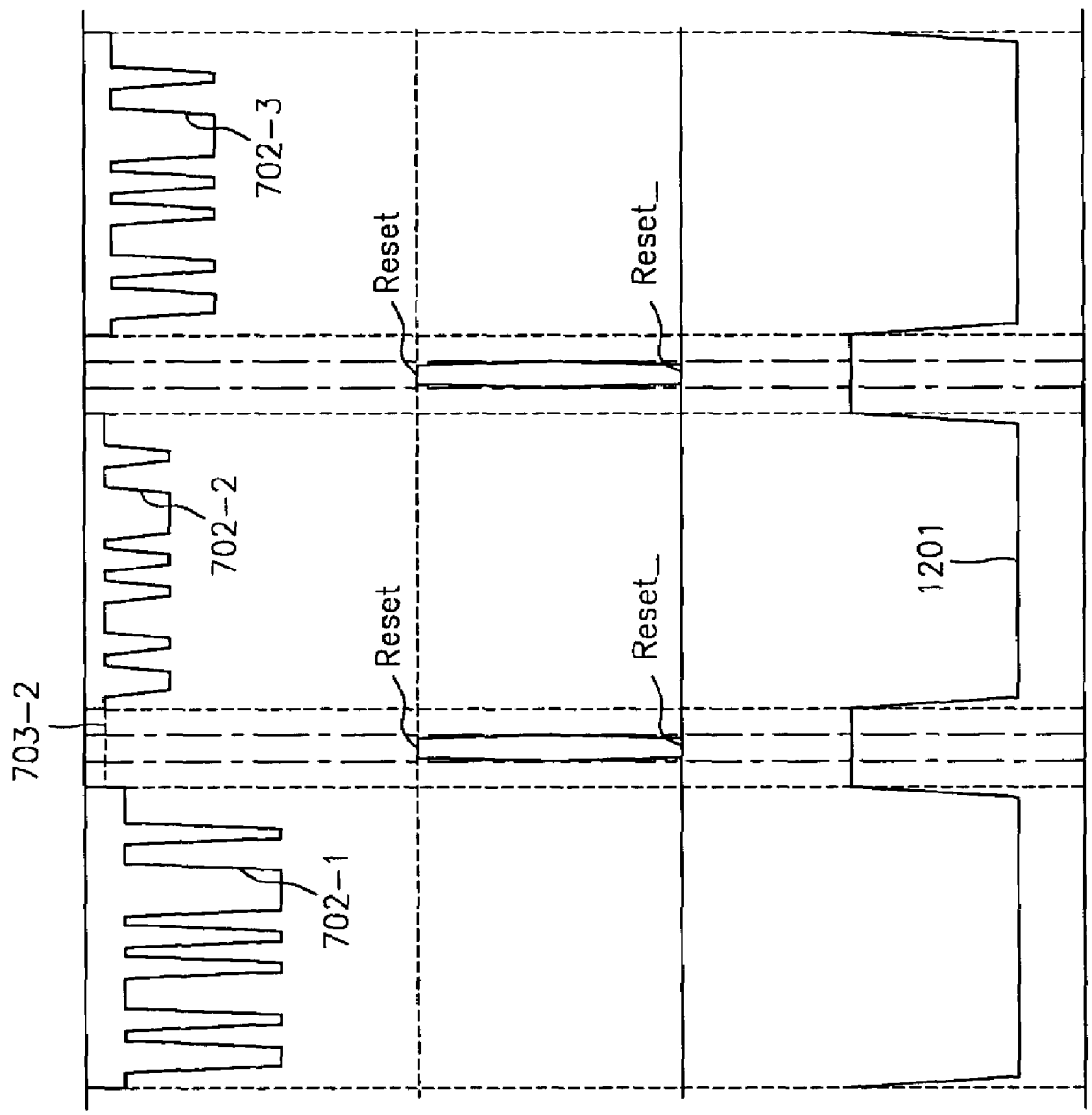
FIGS. 8A through 8C illustrate a characteristic of a control signal CNT used to control first peak detectors 310, 410, and 510 shown in FIGS. 5 through 7.

Referring to FIGS. 8 and 9, capacitors 801 and 802 are discharged as top and bottom peak voltages in a section where burst packets do not exist, as shown in FIG. 8A. Transistors 801 and 802 are discharged by reset signals Reset shown in FIG. 8B in a section where burst packets do not exist. During a discharging operation, a transistor $M_R'$ of the bottom peak detector 514 is turned on by the 20 inverted reset signal Reset_, and a voltage of a node 804 is discharged as a voltage of a node 806. In addition, during the discharging operation, a transistor $M_R$ of the top peak detector 512 is turned on by the reset signal Reset, and a transistor $M_c$ is turned off by the control signal CNT shown in FIG. 8C. As such, the voltage of the node 803 which represents a discharging level of the capacitor 801 is discharged as 0V. In this way, the node 803 is discharged by the transistor $M_c$ as a low voltage of 0V sufficiently lower than a circuit DC voltage. Thus, if a next burst packet is input, a top peak voltage can be detected normally.

However, if the top peak detector 512 does not have the transistor $M_c$ for controlling the discharging voltage of the top peak detector 512, the capacitor 803 is discharged by the reset signal Reset shown in FIG. 8B as a circuit DC voltage higher than a top peak voltage of an optical packet signal to be later input. In this case, when a second burst packet 702-2 is received in FIG. 8A, the voltage of the node 803 having the circuit DC voltage level is higher than a top peak voltage 703-2 of the second burst packet 702-2. Thus, the top peak detector 512 outputs a voltage of a node 805, which is the circuit DC voltage level. Accordingly, the capacitor 801 is not charged, and the top peak detector 512 continuously outputs the voltage of the node 805 such that a right top peak voltage 703-2 of the second burst packet cannot be detected.

Meanwhile, the first limiting amplifier 520 performs differential amplification on the basis of a first reference voltage $V_{ref1}$, normally detected and outputs signals 706 and 707. Therefore, in case of the second peak detector which detects the peak of the signal 706, the first peak detector shown in FIG. 9 may not be used, but a conventional peak detector may be used, as shown in FIG. 10.

Figure 11A:
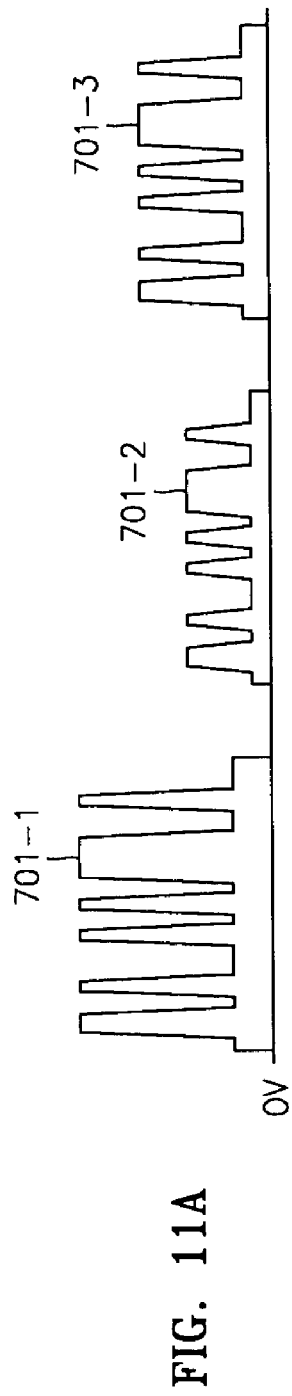
FIGS. 11A through 11C illustrate waveforms of main signals of the burst mode optical receiver shown in FIGS. 5 through 7.
Figure 11B:
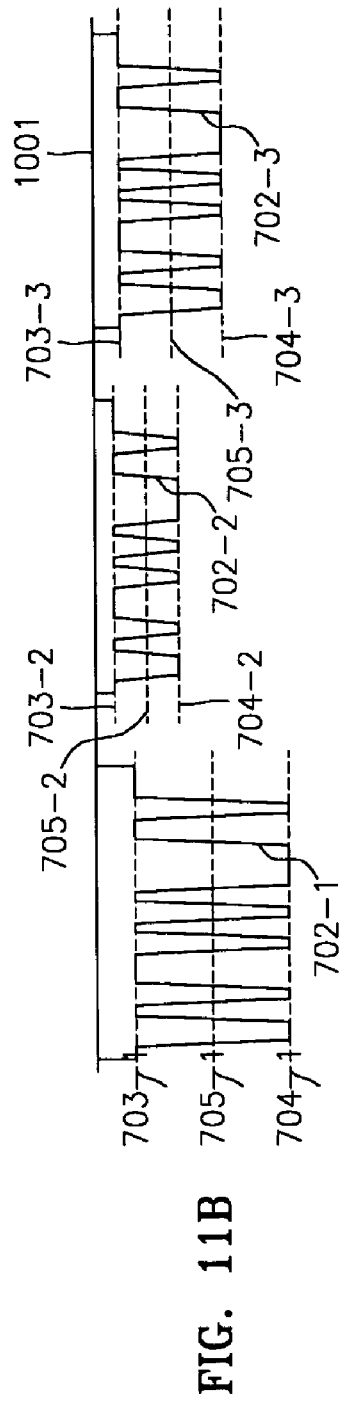
Figure 11C:
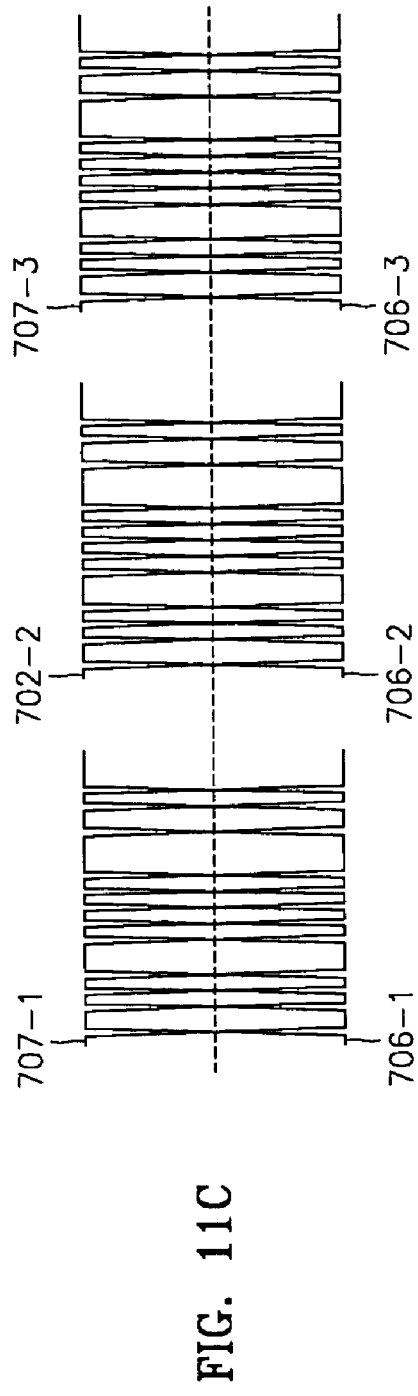

FIGS. 11A through 11C illustrate waveforms of main signals of the burst mode optical receiver shown in FIGS. 5 through 7. For convenience of explanation, assuming waveform diagrams shown in FIGS. 11A through 11C are primary waveform diagrams of the burst mode optical receiver shown in FIG. 7, FIG. 11A illustrates an input signal of the preamplifier 500, and FIG. 11B illustrates an output signal of the preamplifier 500. In addition, FIG. 11C illustrates an output signal of the buffer 550.

Figures 12A, 12B, 12C:
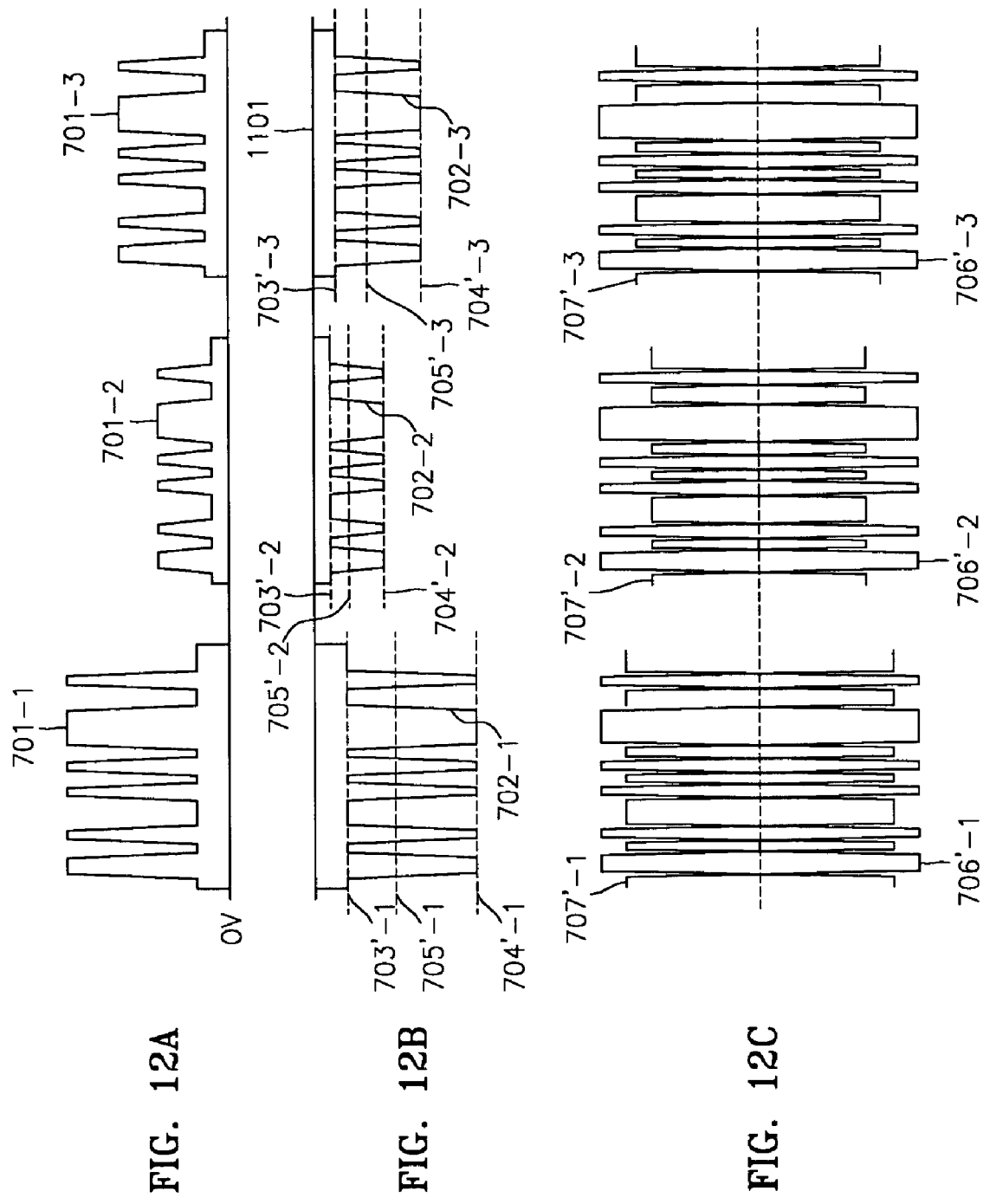
FIGS. 12A through 12C illustrate waveforms of main signals of each element in a case where the first peak detector shown in FIG. 7 is not controlled by the control signal CNT.

FIGS. 12A through 12C illustrate waveforms of main signals of each element in a case where the first peak detector shown in FIG. 7 is not controlled by the control signal CNT. FIG. 12A illustrates an input signal of the preamplifier 500, and FIG. 12B illustrates an output signal of the preamplifier 500. In addition, FIG. 12C illustrates an output signal of the buffer 550.

Referring to FIGS. 7, 11, and 12, predetermined extinction ratio is contained in optical signals 701-1, 701-2, and 701-3 shown in FIG. 11A which have a characteristic of burst and are received through the photo diode PD3. A top peak voltage of each burst packet should be precisely detected as not a circuit DC level 1001 of the first peak detector but top peak voltages 703-1, 703-2, and 703-3 of actual optical signals, as shown in FIG. 11B, so that the first peak detector 510 detects normal middle values 705-1, 705-2, and 705-3 to a node N5. Likewise, if the middle voltage between the top peak voltage and the bottom peak voltage is precisely detected by the first peak detector 510, a normal output from the buffer 550 can be obtained, as shown in FIG. 11C.

However, if a discharging voltage of the first peak detector 510 is not controlled by the control signal CNT, as shown in FIG. 12B, a top peak voltage is wrongly detected as a circuit DC level 1101 of the first peak detector 510. Thus, wrong middle values 705'-1, 705'-2, and 705'-3 are output to the node N5. Due to detection of the wrong middle values, as shown in FIG. 12C, pulse width distortion (PWD) occurs in the output from the buffer 550.

The above operation is performed so as to precisely detect a top peak voltage of an amplified signal when the preamplifier inverts and amplifies an input signal. If the preamplifier does not invert the input signal, due to an extinction ratio, a bottom peak voltage of the amplified signal may be wrongly detected. In this case, the control signal CNT is used to control a discharging voltage of a bottom peak detector of the first peak detector, such that a right bottom peak voltage can be detected.

As above, because of the control signal CNT, the first peak detector of the burst mode optical receiver according to the present invention can precisely detect top and bottom peak voltages of actual optical signals while not being affected by a DC offset corresponding to an extinction ratio even though optical signals having a DC offset corresponding to the extinction ratio are received. Waveform distortion of a signal output from the burst mode optical receiver can be minimized.

As described above, in the burst mode optical receiver according to the present invention, by using a peak detector considering a characteristic of an extinction ratio, top and bottom peak voltages of actual burst packets can be precisely detected while not being affected by a DC offset corresponding to an extinction ratio even though burst packets having a DC offset corresponding to the extinction ratio are received. Accordingly, waveform distortion of a signal output from the burst mode optical receiver can be minimized.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A burst mode optical receiver comprising:
   a photo diode, which receives an optical signal having characteristics of a predetermined extinction ratio and burst from outside and converts the received optical signal into a current signal;
   a preamplifier, which converts the signal converted by the photo diode into a voltage signal, amplifies the voltage-converted signal, and outputs the amplified signal;
   a first peak detector, which includes a first top peak detector to detect a top peak voltage and a first bottom peak detector to detect a bottom peak voltage of the signal amplified by the preamplifier, and outputs a middle value between the detected top peak voltage and the detected bottom peak voltage as a first reference voltage, the first top peak detector receiving a control signal and a reset signal to discharge a circuit in the first top peak detector to a predetermined DC voltage level during a time period when the optical signal does not exist, the first bottom peak detector receiving an inverted reset signal but not the control signal;
   a first limiting amplifier, which inputs the signal amplified by the preamplifier and the first reference voltage and amplifies a difference therebetween;
   a buffer, which buffers the signal limitedly amplified by the first limiting amplifier; and
   an output bottom peak detector, which detects a bottom peak voltage of the signal output from the buffer and outputs the bottom peak voltage as the control signal.

2. The burst mode optical receiver of claim 1, further comprising:
   a second peak detector, which detects the top and bottom peak voltages of the signal limitedly amplified by the first limiting amplifier and outputs a middle voltage therebetween as a second reference voltage; and
   a second limiting amplifier, which inputs the signal limitedly amplified by the first limiting amplifier and the second reference voltage, amplifies a difference therebetween, and outputs the amplified signal to the buffer.

3. The burst mode optical receiver of claim 1, wherein the first peak detector comprises:
   the first top peak detector whose discharging level is controlled at a level lower than a circuit DC voltage by controlling the control signal in the time period when the optical signal does not exist, whose discharging level is charged in another time period when the optical signal exists, and detects a top peak voltage of the signal amplified by the preamplifier;
   the first bottom peak detector, which is discharged to the predetermined DC voltage level in the time period when the optical signal does not exist, charged in the other time period when the optical signal exists, and detects a bottom peak voltage of the preamplifier; and
   a first middle value generator, which outputs a middle value between the top and bottom peak voltages detected by the first top peak detector and the first bottom peak detector, respectively, as the first reference voltage.

4. The burst mode optical receiver of claim 2, wherein the first peak detector comprises:
   the top peak detector whose discharging level is controlled at a level lower than a circuit DC voltage by controlling the control signal in the time period when the optical signal does not exist, whose discharging level is charged in another time period when the optical signal exists, and detects a top peak voltage of the signal amplified by the preamplifier;
   the first bottom peak detector, which is discharged to a predetermined DC voltage level in the time period when the optical signal does not exist, charged in the other time period when the optical signal exists, and detects a bottom peak voltage of the preamplifier; and
   a first middle value generator, which outputs a middle value between the top and bottom peak voltages detected by the first top peak detector and the first bottom peak detector, respectively, as the first reference voltage.

5. The burst mode optical receiver of claim 1, wherein the first peak detector comprises:
   the first top peak detector, which is discharged to the predetermined DC voltage level in the time period when the optical signal does not exist, charged in another time period when the optical signal exists, and detects a top peak voltage of the signal amplified by the preamplifier;
   the first bottom peak detector whose discharging level is controlled at a level higher than the circuit DC voltage by controlling the control signal in the time period when the optical signal does not exist, whose discharging level is charged in the other time period when the optical signal exists, and detects a bottom peak voltage of the signal amplified by the preamplifier; and a first middle value generator, which outputs a middle value between the top and bottom peak voltages detected by the first top peak detector and the first bottom peak detector, respectively, as the first reference voltage.

6. The burst mode optical receiver of claim 2, wherein the second peak detector comprises:
a second top peak detector, which is discharged to the predetermined DC voltage level in the time period when the optical signal does not exist, charged in another time period when the optical signal exists, and detects a top peak voltage of the signal amplified by the preamplifier;
a second bottom peak detector whose discharging level is controlled at a level higher than the circuit DC voltage by controlling the control signal in the time period when the optical signal does not exist, whose discharging level is charged in the other time period when the optical signal exists, and detects a bottom peak voltage of the signal amplified by the preamplifier; and
a second middle value generator, which outputs a middle value between the top and bottom peak voltages detected by the second top peak detector and the second bottom peak detector, respectively, as the second reference voltage.

7. A burst mode optical receiver comprising:
a photo diode, which receives an optical signal having characteristics of a predetermined extinction ratio and burst from outside and converts the received optical signal into a current signal;
a preamplifier, which converts the signal converted by the photo diode into a voltage signal, amplifies the voltage-converted signal, and outputs the amplified signal;
a first peak detector, which includes a first top peak detector to detect a top peak voltage and a first bottom peak detector to detect a bottom peak voltage of the signal amplified by the preamplifier and outputs a middle value between the detected top peak voltage and the detected bottom peak voltage as a first reference voltage, the first top peak detector receiving a control signal and a reset signal to discharge a circuit in the first top peak detector to a predetermined DC voltage level during a time period when the optical signal does not exist, the first bottom peak detector receiving an inverted reset signal but not the control signal;
a first limiting amplifier, which inputs the signal amplified by the preamplifier and the first reference voltage and amplifies a difference therebetween;
a buffer, which buffers the signal limitedly amplified by the first limiting amplifier; and
a second limiting amplifier, which inputs a predetermined comparison voltage and the bottom peak voltage detected by the first peak detector, amplifies a difference therebetween, and outputs an amplification result as the control signal.

8. The burst mode optical receiver of claim 7, further comprising:
a second peak detector, which detects the top and bottom peak voltages of the signal limitedly amplified by the first limiting amplifier and outputs a middle voltage therebetween as a second reference voltage; and
a third limiting amplifier, which inputs the signal limitedly amplified by the first limiting amplifier and the second reference voltage, amplifies a difference therebetween, and outputs the amplified signal to the buffer.

9. The burst mode optical receiver of claim 7, wherein the first peak detector comprises:

the first top peak detector whose discharging level is controlled at a level lower than a circuit DC voltage by controlling the control signal in the time period when the optical signal does not exist, whose discharging level is charged in another time period when the optical signal exists, and detects a top peak voltage of the signal amplified by the preamplifier;
the first bottom peak detector, which is discharged to the predetermined DC voltage level in the time period when the optical signal does not exist, charged in the other time period when the optical signal exists, and detects a bottom peak voltage of the preamplifier; and
a first middle value generator, which outputs a middle value between the top and bottom peak voltages detected by the first top peak detector and the first bottom peak detector, respectively, as the first reference voltage.

10. The burst mode optical receiver of claim 8, wherein the first peak detector comprises:
the first top peak detector whose discharging level is controlled at a level lower than a circuit DC voltage by controlling the control signal in the time period when the optical signal does not exist, whose discharging level is charged in another time period when the optical signal exists, and detects a top peak voltage of the signal amplified by the preamplifier;
the first bottom peak detector, which is discharged to the predetermined DC voltage level in the time period when the optical signal does not exist, charged in the other time period when the optical signal exists, and detects a bottom peak voltage of the preamplifier; and
a first middle value generator, which outputs a middle value between the top and bottom peak voltages detected by the first top peak detector and the first bottom peak detector, respectively, as the first reference voltage.

11. The burst mode optical receiver of claim 7, wherein the first peak detector comprises:
the first top peak detector, which is discharged to the predetermined DC voltage level in the time period when the optical signal does not exist, charged in another time period when the optical signal exists, and detects a top peak voltage of the signal amplified by the preamplifier;
the first bottom peak detector whose discharging level is controlled at a level higher than the circuit DC voltage by controlling the control signal in the time period when the optical signal does not exist, whose discharging level is charged in the other time period when the optical signal exists, and detects a bottom peak voltage of the signal amplified by the preamplifier; and
a first middle value generator, which outputs a middle value between the top and bottom peak voltages detected by the first top peak detector and the first bottom peak detector, respectively, as the first reference voltage.

12. The burst mode optical receiver of claim 8, wherein the second peak detector comprises:
a second top peak detector, which is discharged to the predetermined DC voltage level in the time period when the optical signal does not exist, charged in another time period when the optical signal exists, and detects a top peak voltage of the signal amplified by the preamplifier;
a second bottom peak detector whose discharging level is controlled at a level higher than the circuit DC voltage by controlling the control signal in the time period when the optical signal does not exist, whose discharging level is charged in the other time period when the optical signal exists, and detects a bottom peak voltage of the signal amplified by the preamplifier; and a second middle value generator, which outputs a middle value between the top and bottom peak voltages detected by the second top peak detector and the second bottom peak detector, respectively, as the second reference voltage.

13. A burst mode optical receiver comprising:

a photo diode, which receives an optical signal having characteristics of a predetermined extinction ratio and burst from outside and converts the received optical signal into a current signal; a preamplifier, which converts the signal converted by the photo diode into a voltage signal, amplifies the voltage-converted signal, and outputs the amplified signal;

a first peak detector, which includes a first top peak detector to detect a top peak voltage and a first bottom peak detector to detect a bottom peak voltage of the signal amplified by the preamplifier and outputs a middle value between the detected top peak voltage and the detected bottom peak voltage as a first reference voltage, the first top peak detector receiving a control signal and a reset signal to discharge a circuit in the first top peak detector to a predetermined DC voltage level during a time period when optical signal does not exist, the first bottom peak detector receiving an inverted reset signal but not the control signal;

a first limiting amplifier, which inputs the signal amplified by the preamplifier and the first reference voltage and amplifies a difference therebetween;

a buffer, which buffers the signal limitedly amplified by the first limiting amplifier; and an envelope detector, which detects an envelope of the optical signal and outputs the detected envelope signal as the control signal.

14. The burst mode optical receiver of claim 13, further comprising:

a second peak detector, which detects the top and bottom peak voltages of the signal limitedly amplified by the first limiting amplifier and outputs a middle voltage therebetween as a second reference voltage; and a second limiting amplifier, which inputs the signal limitedly amplified by the first limiting amplifier and the second reference voltage, amplifies a difference therebetween, and outputs the amplified signal to the buffer.

15. The burst mode optical receiver of claim 13, wherein the first peak detector comprises:

the first top peak detector whose discharging level is controlled at a level lower than a circuit DC voltage by controlling the control signal in the time period when the optical signal does not exist, whose discharging level is charged in another time period when the optical signal exists, and detects a top peak voltage of the signal amplified by the preamplifier;

the first bottom peak detector, which is discharged to the predetermined DC voltage level in the time period when the optical signal does not exist, charged in the other time period when the optical signal exists, and detects a bottom peak voltage of the preamplifier; and a first middle value generator, which outputs a middle value between the top and bottom peak voltages detected by the first top peak detector and the first bottom peak detector, respectively, as the first reference voltage.

16. The burst mode optical receiver of claim 14, wherein the first peak detector comprises:

the first top peak detector whose discharging level is controlled at a level lower than a circuit DC voltage by controlling the control signal in the time period when the optical signal does not exist, whose discharging level is charged in another time period when the optical signal exists, and detects a top peak voltage of the signal amplified by the preamplifier;

the first bottom peak detector, which is discharged to the predetermined DC voltage level in the time period when the optical signal does not exist, charged in the other time period when the optical signal exists, and detects a bottom peak voltage of the preamplifier; and a first middle value generator, which outputs a middle value between the top and bottom peak voltages detected by the first top peak detector and the first bottom peak detector, respectively, as the first reference voltage.

17. The burst mode optical receiver of claim 13, wherein the first peak detector comprises:

the first top peak detector, which is discharged to the predetermined DC voltage level in the time period when the optical signal does not exist, charged in another time period when the optical signal exists, and detects a top peak voltage of the signal amplified by the preamplifier;

the first bottom peak detector whose discharging level is controlled at a level higher than the circuit DC voltage by controlling the control signal in the time period when the optical signal does not exist, whose discharging level is charged in the other time period when the optical signal exists, and detects a bottom peak voltage of the signal amplified by the preamplifier; and a first middle value generator, which outputs a middle value between the top and bottom peak voltages detected by the first top peak detector and the first bottom peak detector, respectively, as the first reference voltage.

18. The burst mode optical receiver of claim 14, wherein the second peak detector comprises:

a second top peak detector, which is discharged to the predetermined DC voltage level in the time period when the optical signal does not exist, charged in another time period when the optical signal exists, and detects a top peak voltage of the signal amplified by the preamplifier;

a second bottom peak detector whose discharging level is controlled at a level higher than the circuit DC voltage by controlling the control signal in the time period when the optical signal does not exist, whose discharging level is charged in the other time period when the optical signal exists, and detects a bottom peak voltage of the signal amplified by the preamplifier; and a second middle value generator, which outputs a middle value between the top and bottom peak voltages detected by the second top peak detector and the second bottom peak detector, respectively, as the second reference voltage.

* * * * *